US008420710B2

(12) United States Patent
Tian et al.

(10) Patent No.: US 8,420,710 B2
(45) Date of Patent: Apr. 16, 2013

(54) UV/EB CURABLE BIOBASED COATING FOR FLOORING APPLICATION

(75) Inventors: Dong Tian, Lancaster, PA (US); Jeffrey S. Ross, Lancaster, PA (US); Larry W. Leininger, Akron, PA (US); Mary Kate Boggiano, Stevens, PA (US)

(73) Assignee: Armstrong World Industries, Inc., Lancaster, PA (US)

( * ) Notice: Subject to any disclaimer, the term of this patent is extended or adjusted under 35 U.S.C. 154(b) by 633 days.

(21) Appl. No.: 12/432,845

(22) Filed: Apr. 30, 2009

(65) Prior Publication Data

US 2009/0275674 A1    Nov. 5, 2009

Related U.S. Application Data

(60) Provisional application No. 61/125,918, filed on Apr. 30, 2008.

(51) Int. Cl.
| | |
|---|---|
| C08G 18/28 | (2006.01) |
| C08G 18/00 | (2006.01) |
| C08G 18/67 | (2006.01) |
| C08G 18/69 | (2006.01) |
| C08G 18/68 | (2006.01) |
| B01F 3/22 | (2006.01) |
| C08F 299/04 | (2006.01) |
| C08F 299/06 | (2006.01) |
| C08K 5/205 | (2006.01) |
| C08K 5/04 | (2006.01) |
| C08K 5/09 | (2006.01) |

(52) U.S. Cl.
USPC ............. 522/97; 522/87; 522/88; 522/90; 522/96; 522/104; 522/113; 522/114; 522/107; 522/151; 522/173; 522/174; 522/178; 522/183; 523/124; 523/125; 523/128

(58) Field of Classification Search ............ 522/104, 522/107, 86, 85, 113, 114, 96, 90, 87, 88, 522/89, 97, 108; 428/141, 423.1, 480, 482
See application file for complete search history.

(56) References Cited

U.S. PATENT DOCUMENTS

| | | | | |
|---|---|---|---|---|
| 3,509,234 | A | * | 4/1970 | Burlant et al. ............... 525/126 |
| 4,100,046 | A | * | 7/1978 | Hodakowski et al. ........ 522/103 |
| 4,108,840 | A | * | 8/1978 | Friedlander ................... 525/412 |
| 4,210,693 | A | * | 7/1980 | Regan et al. .................. 428/152 |
| 4,393,187 | A | * | 7/1983 | Boba et al. ...................... 528/60 |
| 4,861,629 | A | * | 8/1989 | Nahm ........................... 427/355 |
| 5,543,232 | A | | 8/1996 | Ehrhart et al. |
| 6,096,809 | A | * | 8/2000 | Lorcks et al. ................... 524/47 |
| 6,248,405 | B1 | | 6/2001 | Kastl et al. |
| 6,916,547 | B2 | | 7/2005 | Tian et al. |
| 7,125,950 | B2 | * | 10/2006 | Dwan'Isa et al. ............ 528/74.5 |
| 7,674,925 | B2 | * | 3/2010 | Garrett et al. .................. 554/26 |
| 2005/0131092 | A1 | | 6/2005 | Kurth et al. |
| 2005/0166797 | A1 | | 8/2005 | Li et al. |
| 2007/0190257 | A1 | | 8/2007 | Huynh-Ba et al. |

OTHER PUBLICATIONS

Dow News Center; Breakthrough Technology from Dow Polyurethanes Promotes Sustainable Chemistry and Excellent Product Performance; Sep. 25, 2007; pp. 1 and 2; http://news.dow.com/dow_news/prodbus/2007/20070925a.htm.
Design News; Polyurethane Foams Get Greener; Dec. 11, 2006; pp. 1 and 2; http://www.designnews.com/index.asp?layout=articlePrint&articleID=CA6395310.

* cited by examiner

*Primary Examiner* — Sanza McClendon
(74) *Attorney, Agent, or Firm* — McNees Wallace & Nurick LLC

(57) ABSTRACT

A radiation curable biobased coating, such as a UV/EB curable biobased coating, for flooring applications includes a biobased component comprising renewable and/or biobased materials. The biobased component is selected from the group consisting of a biobased resin, a biobased polyol acrylate, or a biobased polyol. The biobased component is blended with a coating formula. The coating formula includes at least one initiator. The radiation curable biobased coating contains at least about 5% weight of renewable materials or biobased content.

27 Claims, No Drawings

UV/EB CURABLE BIOBASED COATING FOR FLOORING APPLICATION

CROSS-REFERENCE TO RELATED APPLICATIONS

This application claims priority from U.S. Patent Application Ser. No. 61/125,918, filed Apr. 30, 2008, which is hereby incorporated by reference in its entirety.

FIELD OF THE INVENTION

The present invention relates to biobased coatings for flooring applications, and more particularly to an ultraviolet (UV)/electron beam (EB) curable biobased coating for flooring applications.

BACKGROUND OF THE INVENTION

Radiation curable coatings, such as UV/EB curable coatings, are applied to various types of substrates to enhance their durability and finish. The radiation curable coatings are typically resin based mixtures of oligomers or monomers that are cured or cross-linked after being applied to the substrate by radiation curing. The radiation curing polymerizes the resins to produce a high or low gloss coating having superior abrasion and chemical resistance properties. The radiation curable coatings of this type are often referred to as topcoats or wear layers and are used, for example, in a wide variety of flooring applications, such as on linoleum, hardwood, laminate, cork, bamboo, resilient sheet, and tile flooring.

The above-described radiation curable coatings are made from fossil fuels, such as petroleum and coal. Because the use of fossil fuels negatively impacts the environment, new radiation curable coatings need to be developed which are derived from recycled materials or renewable resources, such as biobased materials. Recycled materials are materials that have been recovered or otherwise diverted from the solid waste stream, either during the manufacturing process (pre-consumer), or after consumer use (post-consumer). Recycled materials therefore include post-industrial, as well as, post-consumer materials. Biobased materials are organic materials containing an amount of non-fossil carbon sourced from biomass, such as plants, agricultural crops, wood waste, animal waste, fats, and oils. The biobased materials formed from biomass processes therefore have a different radioactive C14 signature than those produced from fossil fuels. Because the biobased materials are organic materials containing an amount of non-fossil carbon sourced from biomass, the biobased materials may not necessarily be derived 100% from biomass. A test has therefore been established for determining the amount of biobased content in the biobased material. Generally, the amount of biobased content in the biobased material is the amount of biobased carbon in the material or product as a fraction weight (mass) or percentage weight (mass) of total organic carbon in the material or product.

The calculation of the amount of biobased content in the material or product is important for ascertaining whether the material or product, when used in commercial construction, would qualify for Leadership in Energy and Environmental Design (LEED) certification. The US Green Building Council has established a LEED rating system which sets forth scientifically based criteria for obtaining LEED certification based on a point system. As shown in Table 1, under the LEED rating system, for new construction 1 point is granted for at least 5% wt of the total of post-consumer materials and ½ post-industrial materials. A second point is granted for at least 10% wt of the total of post-consumer materials and ½ post-industrial materials. An additional point is granted for at least 5% wt of rapidly renewable building materials and products. For existing building 1 point is granted for at least 10% wt post-consumer materials. A second point is granted for at least 20% wt of post-industrial materials. An additional point is granted for at least 50% wt of rapidly renewable materials. Thus, flooring products meeting the LEED criteria can be used to obtain points for LEED certification.

TABLE 1

| LEED Rating System | | | |
|---|---|---|---|
| Rating System | LEED - Version 2.1 New Construction | Rating System | LEED - Version 2.0 Existing Building |
| MR Credit 4.1 1 Point | =5% wt of post-consumer materials + ½ post-industrial materials | MR Credit 2.1 1 Point | =10% wt of post-consumer materials |
| MR Credit 4.2 1 Point | =10% wt of post-consumer materials + ½ post-industrial materials | MR Credit 2.1 1 Point | =20% wt of post-industrial materials |
| MR Credit 6 1 Point | =5% wt of rapidly renewable building materials and products | MR Credit 2.5 1 Point | =50% wt of rapidly renewable materials |

Because there has been renewed market interest in giving preference to "greener" flooring products based upon the LEED rating system, there remains a need to develop "greener" flooring products based upon existing product structures/processes and available renewable materials. The key to this approach is to integrate rapidly renewable materials, such as biobased materials, into the radiation curable coatings, such as those used in flooring applications, to reduce reliance on limited resources such as fossil fuels.

BRIEF SUMMARY OF THE INVENTION

The present invention provides a radiation curable biobased coating such as a UV/EB curable biobased coating, for flooring applications comprising a biobased component including renewable and/or biobased materials. The biobased component is selected from the group consisting of a biobased resin, a biobased polyol acrylate, or a biobased polyol. The biobased component is blended with a coating formula. The coating formula includes at least one initiator. The radiation curable biobased coating contains at least about 5% weight of renewable materials or biobased content.

The present invention further provides a flooring application comprising a substrate having at least one surface provided with a radiation curable biobased coating. The radiation curable biobased coating comprises a biobased component. The biobased component is selected from the group consisting of a biobased resin, a biobased polyol acrylate, or a biobased polyol. The biobased component is blended with a coating formula. The coating formula includes at least one initiator. The radiation curable biobased coating contains at least about 5% weight of renewable materials or biobased content.

DETAILED DESCRIPTION OF THE EMBODIMENT(S)

The present invention provides a radiation curable biobased coating, such as a UV/EB curable biobased coating, for flooring applications wherein the radiation curable biobased coating contains a biobased component comprising renewable and/or biobased materials. The radiation curable biobased coating is generally formed by acrylating a biobased polyol and reacting the biobased polyol acrylate with di-isocyanates or tri-isocyanates to make a biobased resin. The biobased resin is then blended into a radiation curable biobased coating formulation comprising at least one initiator to form the radiation curable biobased coating. In another embodiment, the biobased polyol acrylate is directly blended into the radiation curable biobased coating formulation comprising the at least one initiator to form the radiation curable biobased coating. In a further embodiment, the biobased polyol is directly blended into a radiation curable biobased coating formulation comprising at least one epoxy resin or vinyl ether and at least one initiator, which may be, for example, a cationic type photoinitiator, to form the radiation curable biobased coating.

The biobased polyol may be made from various diacids or diols, which are derived from renewable and/or biobased material. The biobased polyol is-derived from renewable and/or biobased materials and contains a weight percentage of renewable materials or biobased content of at least about 5%, preferably at least about 75%, and more preferably at least about 95%. The biobased polyol may be derived, for example, from plant oils extracted from plant seeds, such as castor oil, linseed oil, soy oil, tall oil (pine oil), tung oil, vernonia oil, lesquerella oil (bladderpod oil), cashew shell oil, or other plant oils rich in unsaturated fatty acids. The plant oils include triglycerides generally comprised of esters formed from glycerol and saturated and unsaturated fatty acids. A typical structure of a triglyceride unsaturated fat contains three fatty acids esterified to three hydroxyl groups of glycerol. The triglycerides are converted to individual saturated fatty acids, unsaturated fatty acids, and glycerol by acid or base catalyzed transesterification. Examples of some of the acid components in various plant oils are listed in Table 2.

TABLE 2

| Plant Oil Acids | |
|---|---|
| Plant Oil | Acid |
| Castor Oil | Ricinoleic |
| Linseed Oil | Linolenic, Linoleic, Oleic |
| Soy Oil | Palmitic, Linoleic, Oleic |
| Tall Oil (Pine Oil) | Palmitic, Linoleic, Oleic |
| Tung Oil | Eleaostearic |
| Vernonia Oil | Vernolic |

TABLE 2-continued

| Plant Oil Acids | |
|---|---|
| Plant Oil | Acid |
| Lesquerella Oil (Bladderpod Oil) | Lesquerolic, Oleic, Linoleic |
| Cashew Shell Oil | Cardanol |

The unsaturated fatty acids are of particular, interest as precursor chemicals for polyol synthesis because they have the functionality for satisfactory derivitization. Specifically, the unsaturated fatty acids contain functional groups, such as olefinic, hydroxyl, and epoxy, on a long carbon chain. For example, castor oil and lesquerella oil (bladderod oil) have a pendent hydroxyl group, and vernonia oil has a natural epoxy group. Thus, the unsaturated fatty acids include several chemical functions that facilitate polymer synthesis, such as unsaturated carbon chains, hydroxyl groups, ester linkages, and epoxy functions. As a result, the unsaturated fatty acids of the plant oils enable direct radiation cross-linking or chemical modifications toward polyol synthesis. Because many biobased polyols made from plant oils are commercially available, and the method of forming biobased polyols from plant oils is well known in the art, further description of the biobased polyols, made from plant oils has been omitted.

Alternatively, the biobased polyol may be a biobased polyester polyol or biobased polyester-ether polyol. The biobased polyester polyols and the biobased polyester-ether polyols may be made, for example, from biobased diols and biobased diacids derived from renewable resources, such as corn, sugar cane, vegetable oil, and the like. The biobased diol may be selected from the group consisting, for example, of 1,3 propanediol, 1,4 butanediol, propylene glycol, glycerol, and combinations thereof. The biobased diacid may be selected from the group consisting, for example, of sebacic acid, furnaric acid, succinic acid, tumaric acid, malic acid, dicarboxylic acid, citric acid, azelaic acid, lactic acid, and any combination thereof. Additional additives include surfactant, defoamer, organic and/or inorganic flatting agents, abrasion fillers, texture particles, and the like.

Table 3A shows some examples of some biobased polyester polyol formulations. Reaction of the diacid with the diol produces the biobased polyester polyol by condensation, with water as a by-product. For example, the biobased polyester polyol may be prepared according to the procedure set forth in Examples 1-4 of U.S. Pat. No. 5,543,232, which is hereby incorporated by reference in its entirety. Because the method of preparing polyester polyols is well known in the art, further description thereof has been omitted.

TABLE 3A

| | Biobased Polyester Polyol Formulations | | | | | | | |
|---|---|---|---|---|---|---|---|---|
| Ingredient | EX-1 Amt (g) | EX-2 Amt (g) | EX-3 Amt (g) | EX-4 Amt (g) | EX-5 Amt (g) | EX-6 Amt (g) | EX-7 Amt (g) | EX-8 Amt (g) |
| Sebacic Acid | 639.18 | 648.31 | 663.10 | 672.94 | 0 | 0 | 0 | 0 |
| Succinic Acid | 0 | 0 | 0 | 0 | 539.50 | 551.69 | 557.92 | 570.97 |
| 1,3 Propanediol | 360.72 | 291.48 | 336.80 | 264.57 | 460.40 | 360.65 | 441.99 | 338.32 |
| Glycerine | 0 | 60.10 | 0 | 62.39 | 0 | 87.56 | 0 | 90.81 |
| Fascat 4100 | 0.10 | 0.10 | 0.10 | 0.10 | 0.10 | 0.10 | 0.10 | 0.10 |
| Wt % Renewable Materials | 99.99 | 99.99 | 99.99 | 99.99 | 99.99 | 99.99 | 99.99 | 99.99 |
| Wt % Biobased Content | 99.99 | 99.99 | 99.99 | 99.99 | 99.99 | 99.99 | 99.99 | 99.99 |

The biobased polyester polyol may also be made by ring opening polymerization of lactone, lactide, and glycolide in the presence of a biobased diol or triol, such as 1,3 propanediol, 1,4 butanediol, glycerol, and combinations thereof, as initiator and a ring-opening polymerization catalyst. Table 3B shows some examples of some biobased polyester polyol formulations made by ring opening polymerization. These biobased polyester polyols may be prepared according to the procedure set forth in U.S. Pat. No. 6,916,547, which is hereby incorporated by reference in its entirety. For example, these biobased polyester polyols may be prepared by charging lactone/lactide monomer(s) and Bio-PDO into a 1 liter glass reactor equipped with anchor stirrer, temperature probe, nitrogen sparge tube and air condenser, and stirring at 175 rpm with 0.4 SCFH nitrogen sparge. The polymerization catalyst stannous 2-ethyl hexanoate is then charged. The nitrogen sparge is continued for 10 minutes. The nitrogen charge is then maintained, and the reactants are heated to 130 degrees Celsius over 30 minutes. The nitrogen sparge is then maintained at 130 degrees Celsius for 6-14 hours until the reaction is complete. The batch is then cooled to 30 degrees Celsius and discharged.

TABLE 3B

Biobased Polyester Polyol Formulations

| Ingredient | EX-9 Amt (g) | EX-10 Amt (g) | EX-11 Amt (g) |
|---|---|---|---|
| Caprolactone | 500.00 | 0 | 250.00 |
| Lactide | 0 | 550.00 | 250.00 |
| 1,3-Propanediol | 154.36 | 134.47 | 138.30 |
| Stannous 2-ethyl hexanoate | 0.0654 | 0.0684 | 0.0388 |
| Wt % Renewable Materials | 23.59 | 99.99 | 60.83 |
| Wt % Biobased Content | 19.21 | 99.99 | 54.91 |

The biobased polyol may also be a biobased polyether polyol. The biobased diol may be selected from the group consisting, for example, of 1,3 propanediol and 1,4 butanediol, propylene glycol, glycerol, and combinations thereof. Examples of biobased polyether polyols include poly(trimethylene ether glycol) and poly(tetramethylene ether glycol). One commercially available poly(trimethylene ether glycol) is CERENOL manufactured by E.I. du Pont de Nemours and Company of Wilmington, Del. CERENOL is made 1,3 propanediol originating from corn sugar via aerobic fermentation. The biobased content of poly(trimethylene ether glycol) made from polycondensation of 1,3 propanediol originating from corn sugar via aerobic fermentation is about 100%.

Additionally, the biobased polyol may be derived, for example, from vegetable oils, corn, oats, cellulose, starch, sugar, sugar alcohols, such as xylitol, sorbitol, maltitol, sucrose, glycol, glycerol, erythritol, arabitol, rebitol, mannitol, isomalt laetitol, fructose, or polysaccharides or monosaccharides originated from cellulose, starches, or sugars. It will be appreciated by those skilled in the art that other renewable and/or biobased materials containing primary and secondary hydroxyl groups could also be used as the biobased polyol, because such renewable and/or biobased materials are capable of acylated, as described herein, to form the radiation curable biobased coating of the present invention.

The biobased polyol is partially or fully acrylated to form a biobased polyol acrylate. Because the biobased polyol acrylate is derived from renewable and/or biobased materials, the biobased polyol acrylate contains a weight percentage of renewable materials of at least about 5%, preferably at least about 50%, and more preferably at least about 70%. The biobased polyol acrylate may be formed, for example, by reacting the biobased polyol with acrylic acid. Table 4 shows some examples of some biobased polyol acrylate formulations using the biobased polyols made from castor oil (Polycin D-290; Polycin M-280; Polycin D-265; Polycin D-140), and soy oil (Soyol R2-052-F; Soyol R3-1710-F).

TABLE 4

Biobased Polyol Acrylate Formulations

| Ingredient | EX-12 Amt (g) | EX-13 Amt (g) | EX-14 Amt (g) | EX-15 Amt (g) | EX-16 Amt (g) | EX-17 Amt (g) | EX-18 Amt (g) |
|---|---|---|---|---|---|---|---|
| Polycin D-290 | 800.00 | 0 | 0 | 800.00 | 0 | 0 | 0 |
| Polycin M-280 | 0 | 500.00 | 0 | 0 | 0 | 0 | 0 |
| Polycin D-265 | 0 | 0 | 450.00 | 0 | 0 | 0 | 0 |
| Polycin D-140 | 0 | 0 | 0 | 0 | 800.00 | 0 | 0 |
| Soyol R2-052-F | 0 | 0 | 0 | 0 | 0 | 800.00 | 0 |
| Soyol R3-1710-F | 0 | 0 | 0 | 0 | 0 | 0 | 800.00 |
| Acrylic Acid | 328.29 | 108.00 | 91.70 | 179.07 | 86.40 | 33.38 | 104.73 |
| p-toluene sulfonic acid | 5.40 | 3.38 | 3.04 | 5.40 | 5.40 | 5.40 | 5.40 |
| Hydroquinone | 0.12 | 0.08 | 0.07 | 0.12 | 0.12 | 0.12 | 0.12 |
| Monomethyl ether hydroquinone (p-methoxyphenol) | 0.12 | 0.08 | 0.07 | 0.12 | 0.12 | 0.12 | 0.12 |
| Phosphorous Acid | 0.62 | 0.39 | 0.35 | 0.62 | 0.62 | 0.62 | 0.62 |
| n-heptane | 200 ml | 182.75 | 0 | 0 | 0 | 0 | 0 |
| Toluene | 0 | 0 | 130.06 | 200 ml | 200 ml | 200 ml | 200 ml |
| N-methyl-diethanolamine | 0 | 0 | 0 | 0 | 0 | 0 | 0 |
| Reaction Temperature | 100-105° C. | 100-105° C. | 110-112° C. | 110-112° C. | 110-112° C. | 110-112° C. | 110-112° C. |
| Wt % Renewable Materials | 70.51 | 81.71 | 82.53 | 81.19 | 89.62 | 95.28 | 87.82 |

A method for acrylating the biobased polyol using the formulation in Table 4, EX-14 will now be described. A 1.0 liter jacketed glass reaction flask is prepared for toluene reflux and water separation. The flask is sparged with about 0.5 standard cubic feet per hour of dry air and about 1.5 standard cubic feet per hour nitrogen blend. An anchor stirrer is activated at about 200 rpm. The polycin D-265, hydroquinone, monomethyl ether hydroquinone (p-methoxyphenol), and phosphorous acid are charged. The reactants are then heated to about 60 degrees Celsius. The acrylic acid and p-toluene sulfonic acid are charged. The p-toluene sulfonic acid is allowed to dissolve. The toluene is charged. The jacket of the glass reaction flask is heated to and maintained at a temperature of about 125 degrees Celsius. The reactants temperature is controlled at about 116-119 degrees Celsius by regulating the amount of the toluene. The toluene is refluxed back to the reactants and the reaction water is separated. The reaction water is then collected and measured. The conditions are maintained until the reaction water ceases. The jacket of the glass reaction flask is then reset to about 100 degrees Celsius, and a vacuum distillation is prepared to remove the toluene. When the reactants temperature reaches about 100 degrees Celsius, the blanket of dry air and nitrogen blend is slowly turned off and a vacuumed is slowly applied. The vacuum is continued at 26" Hg until the toluene distillation ceases. The batch is then cooled and discharged.

The biobased polyol acrylate is then reacted with di-isocyanates or tri-isocyanates or reacted with di-isocyanates or tri-isocyanates and UV/EB moieties to form a biobased resin, such as a biobased urethane acrylate or a biobased polyester acrylate. Because the biobased resin is derived from renewable and/or biobased materials, the biobased resin contains a weight percentage of renewable materials of at least about 5%, preferably at least about 50%, and more preferably at least about 65%. The biobased resin comprises a mixture of crosslinkable monomers and oligomers having reactive groups capable of providing the ability to polymerize upon exposure to radiation, such as UV/EB radiation. Table 5 shows some examples of some biobased resin formulations using the biobased polyol acrylates from Table 4.

TABLE 5

Biobased Resin Formulations

| Ingredient | EX-19 Amt (g) | EX-20 Amt (g) | EX-21 Amt (g) |
|---|---|---|---|
| EX-14 | 600.00 | 0 | 459.85 |
| EX-18 | 0 | 600.00 | 0 |
| Desmodur W | 132.48 | 23.60 | 101.53 |
| Silwet L-7200 | 1.89 | 0 | 1.45 |
| Iragacure 184 | 5.49 | 0 | 4.21 |
| Benzophenone | 21.97 | 0 | 16.84 |
| Wt % Renewable Materials | 65.00 | 84.49 | 65.00 |

A method for reacting the biobased polyol acrylate to produce the biobased resin using the formulation in Table 5, EX-21 will now be described. EX-14 from Table 4 is charged to a 1.0 liter jacketed glass reaction flask. An anchor stirrer is activated at about 200 rpm, and EX-14 is heated to about 35 degrees Celsius. The flask is blanketed with about 1.1 standard cubic feet per hour of dry air for about 30 minutes. EX-14 is heated to about 50 degrees Celsius. The blanket of dry air is adjusted to about 0.45 standard cubic feet per hour. Desmodur W is charged in one third increments (about 33.84 g) and exotherm is observed with each addition. The reactants are maintained at a temperature of about 85 degrees Celsius over about a 2 hour period. The reactants are then held at a temperature of about 85 degrees Celsius, and infrared is used to monitor the decline in the numerically controlled oscillator (NCO) peak. When the NCO peak is gone, the batch is cooled to about 60 degrees Celsius. The Silwet L-7200, Irgacure 184, and benzophenone are then charged and mixed for about 30 minutes until all dissolved. The batch is then cooled and discharged.

The biobased resin is then blended, for example, with an initiator, surfactant, and other additives, such as acrylate reactive diluents, defoamer, matting agent, abrasion agent, and texture particles, to form the radiation curable biobased coating. The acrylate reactive diluents may include, for example, (meth) acrylic acid, isobornyl (meth)acrylate, isodecyl (meth)acrylate, hexanediol di(meth)acrylate, N-vinyl formamide, tetraethylene glycol (meth)acrylate, tripropylene glycol(meth)acrylate, neopentyl glycol di(meth)acrylate, ethoxylated neopentyl glycol di(meth)acrylate, propoxylated neopentyl glycol di(meth)acrylate, trimhethylol propan tri (meth)acrylate, ethoxylated trimethylol propan tri(meth) acrylate, propoxylated trimethylol propan tri(meth)acrylate, ethoxylated or propoxylated tripropylene glycol di(meth) acrylate, pentaerythritol tri(meth)acrylate, pentaerythritol tetra(meth)acrylate, tris (2-hydroxy ethyl) isocyanurate tri (meth)acrylate, and combinations thereof. The initiator may be any chemical capable of initiating, assisting, or catalyzing the polymerization and/or cross-linking of the biobased resin. The initiator may be, for example, a photoinitiator or photosensitizer that allows the biobased coating to cure when exposed to UV/EB radiation. The initiators may be chosen to increase curing rate and sensitivity to specific wavelengths of UV/EB radiation. The concentration of the initiator is the amount necessary to provide satisfactory curing for the biobased resin in the coating mixture.

Table 6A shows some examples of some radiation curable biobased coating formulations using the biobased resins from Table 5 based on a free radical curing mechanism. Because the radiation curable biobased coating is derived from renewable and/or biobased materials, the radiation curable biobased coating contains a weight percentage of renewable materials of at least about 5%, preferably at least about 30%, and more preferably at least about 40%.

TABLE 6A

Radiation Curable Biobased Coating Formulations

| Ingredient | EX-22 Amt (g) | EX-23 Amt (g) | EX-24 Amt (g) | EX-25 Amt (g) |
|---|---|---|---|---|
| EX-21 | 50.00 | 50.00 | 50.00 | 50.00 |
| SR-3010 | 28.13 | 20.00 | 12.50 | 6.00 |
| Silwet L-7200 | 0.07 | 0.05 | 0.03 | 0.02 |
| Irgacure 184 | 0.21 | 0.15 | 0.09 | 0.05 |
| Benzophenone | 0.84 | 0.60 | 0.38 | 0.18 |
| Wt % Renewable Materials | 41.01 | 45.91 | 51.59 | 57.78 |

In another embodiment, the biobased polyol acrylate is directly blended into a radiation curable biobased coating formulation similar to the radiation curable biobased coating formulations in Table 6A to form the radiation curable biobased coating. The biobased polyol acrylate may be, for example, any of the biobased polyol acrylates from Table 4, and the biobased polyol acrylate would be substituted for EX-21 in Table 6A.

In a further embodiment, the biobased polyol is directly blended into a radiation curable biobased coating formulation comprising at least one epoxy resin or vinyl ether and at least one initiator, which may be, for example, a cationic type photoinitiator, to form the radiation curable biobased coating. The biobased polyol may be, for example, any of the biobased polyols from Tables 3A-3B or combinations thereof. The epoxide resins may include, for example, 3,4-epoxycyclo-hexylmethyl-3,4-epoxycyclohexane carboxylate, bis-(3,4-epoxycyclohexyl) adipate, 3-ethyl-3-hydroxy-methyl-oxetane, 1,4-butanedial diglycidyl ether, 1,6 hexanediol diglycidyl ether, ethylene glycol diglycidyl ether, polypropylene glycol diglycidyl ether, polyglycol diglycidyl ether, propoxylated glycerin triglycidyl ether, monoglycidyl ester of neodecanoic acid, epoxidized soy, epoxidized linseed oil, epoxidized polybutadiene resins, or combinations thereof. The vinyl ether resins may include, for example, 1,4-butanediol divinyl ether, diethyleneglycol divinyl ether, triethyleneglycol divinyl ether, N-vinyl caprolactam, N-vinylformamide, N-vinyl pyrrolidone, n-butyl vinyl ether, tert-butyl vinyl ether, cyclohexyl vinyl ether, dodecyl vinyl ether, octadecyl vinyl ether, trimethylolpropane diallyl ether, allyl pentaerythritol, trimethylolpropane monoallylether, or combinations thereof. The initiator may be, for example, a cationic photoinitiator and a photosensitizer, such as triarylsulfonium hexafluoroantimonate salts, triarylsulfonium hexafluorophosphate salts, bis(4-methylphenyl)-hexafluorophosphate-(1)-iodonium, isopropyl thioxanthone, 1-chloro-4-propoxy-thioxanthone, 2,4-diethylthioxanthone, 2-chlorothioxanthone, camphorquinone.

Table 6B shows some examples of some radiation curable biobased coating formulations using the biobased polyols from Table 3A based on cationic curing mechanism.

TABLE 6B

Radiation Curable Biobased Coating Formulations

| Ingredient | | EX-26 | EX-27 |
|---|---|---|---|
| Chemical Name | Function | Amt (g) | Amt (g) |
| EX-5 | resin | 12.5 | 12.5 |
| 3,4-epoxy cyclohexyl methyl-3,4 epoxy cyclohexane carboxylate | resin | 50 | 50 |
| Silwet L-7200 | surfactant | 0.156 | 0.156 |
| Isopropylthioxanthone | photosensitizer | 0.313 | 0 |
| 2,4-diethyl thioxanthone | photosensitizer | 0 | 0.313 |
| Arylsulfoniumhexafluoro-phosphate | photoinitiator | 3.75 | 3.75 |
| Gasil UV70C | flatting agent | 5.3375 | 5.3375 |
| Wt % Renewable Materials | | 17.35 | 17.35 |
| Wt % Biobased Content | | 13.32 | 13.31 |

The radiation curable biobased coating is then applied to a surface of a substrate and is cured or cross-linked by radiation curing to form a topcoat or wear layer thereon. The substrate may be made, for example, from a variety of materials, such as wood, ceramic, plastic, or metal. Additionally, the substrate may be, for example, a substrate of a flooring application, such as linoleum, hardwood, laminate, cork, bamboo, resilient sheet, or tile. The radiation curable biobased coating may be radiation cured, for example, with UV/EB radiation. For example, standard high pressure mercury vapor type UV lamps with wavelengths of about 1800-4000 Angstrom units can be used to cure the radiation curable biobased coating, as well as UV lamps containing additives to enhance specific UV regimes. The radiation curable biobased coating is exposed to the UV lamps at about 0.5-2.5 joules per centimeter squared at about 0.3-1.2 watts megawatts per centimeter squared. It will be appreciated by those skilled in the art, however, that the length and intensity of the exposure to the radiation may vary depending oh the thickness and composition of the radiation curable biobased coating and the desired finish, e.g., gloss level. Additionally, the radiation curable biobased coating may be cured in air or nitrogen depending upon the composition of the radiation curable biobased coating and the desired finish.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. A radiation curable biobased coating comprising:
   a biobased component selected from the group consisting of a biobased resin, a biobased polyol acrylate, or a biobased polyol, the biobased component being blended with a coating formula, the coating formula including at least one initiator, wherein the radiation curable biobased coating contains at least about 5% weight of renewable materials or biobased content;
   wherein the biobased component is at least partially formed by one or more of acrylic acid, di-isocyanates, or tri-isocyanates; and
   wherein the biobased component is a biobased polyester or a biobased poly urethane and the coating formula includes at least one epoxy resin or vinyl ether.

2. The radiation curable biobased coating of claim 1, wherein the biobased polyol acrylate contains at least about 50% weight of renewable materials.

3. The radiation curable biobased coating of claim 2, wherein the biobased polyol acrylate contains at least about 70% weight of renewable materials.

4. The radiation curable biobased coating of claim 1, wherein the radiation curable biobased coating contains at least about 30% weight of renewable materials.

5. The radiation curable biobased coating of claim 4, wherein the radiation curable biobased coating contains at least about 40% weight of renewable materials.

6. The radiation curable biobased coating of claim 1, wherein the biobased component is a biobased urethane acrylate or a biobased polyester acrylate.

7. The radiation curable biobased coating of claim 1, wherein the biobased component comprises plant oil.

8. The radiation curable biobased coating of claim 7, wherein the plant oil is selected from the group consisting of castor oil, linseed oil, soy oil, tall oil, tung oil, vernonia oil, lesquerella oil, and cashew shell oil.

9. The radiation curable biobased coating of claim 1, wherein the biobased component comprises a biobased polyester polyol, a biobased polyester-ether polyol, or a biobased polyether polyol.

10. The radiation curable biobased coating of claim 1, wherein the biobased component comprises a biobased diol or biobased diacid.

11. The radiation curable biobased coating of claim 10, wherein the biobased diol is selected from the group consisting of 1,3 propanediol, 1,4 butanediol, propylene glycol, and glycerol, and combinations thereof, and the biobased diacid is selected from the group consisting of sebacic acid, fumaric acid, succinic acid, tumaric acid, malic acid, and dicarboxylic acid, citric acid, azelic acid, lactic acid, and combinations thereof.

12. The radiation curable biobased coating of claim 1, wherein the biobased component comprises ultraviolet or electron beam moieties.

13. The radiation curable biobased coating of claim 1, wherein the initiator is a cationic type initiator.

14. The radiation curable biobased coating of claim 13, wherein the initiator further includes a photosensitizer.

15. A flooring application, comprising:
a substrate having at least one surface provided with the radiation curable biobased coating; and
the radiation curable biobased coating comprising a biobased component, the biobased component being selected from the group consisting of a biobased resin, a biobased polyol acrylate, or a biobased polyol, the biobased component being blended with a coating formula, the coating formula including at least one initiator, wherein the radiation curable biobased coating contains at least about 5% weight of renewable materials or biobased content;
wherein the biobased component is at least partially formed by one or more of acrylic acid, di-isocyanates, or tri-isocyanates; and
wherein the biobased component is a biobased polyester or a biobased poly urethane and the coating formula includes at least one epoxy resin or vinyl ether.

16. The flooring application of claim 15, wherein the biobased polyol acrylate contains at least about 50% weight of renewable materials.

17. The flooring application of claim 16, wherein the biobased polyol acrylate contains at least about 70% weight of renewable materials.

18. The flooring application of claim 15, wherein the radiation curable biobased coating contains at least about 30% weight of renewable materials.

19. The flooring application of claim 18, wherein the radiation curable biobased coating contains at least about 40% weight of renewable materials.

20. The flooring application of claim 15, wherein the biobased component is a biobased urethane acrylate or a biobased polyester acrylate.

21. The flooring application of claim 15, wherein the biobased component comprises plant oil.

22. The flooring application of claim 21, wherein the plant oil is selected from the group consisting of castor oil, linseed oil, soy oil, tall oil, tung oil, vernonia oil, lesquerella oil, and cashew shell oil.

23. The flooring application of claim 15, wherein the biobased component comprises a biobased polyester polyol, a biobased polyester-ether polyol, or a biobased polyether polyol.

24. The flooring application of claim 15, wherein the biobased component comprises a biobased diol or biobased diacid.

25. The flooring application of claim 24, wherein the biobased diol is selected from the group consisting of 1,3 propanediol, 1,4 butanediol, propylene glycol, and glycerol, and combinations thereof, and the biobased diacid is selected from the group consisting of sebacic acid, fumaric acid, succinic acid, tumaric acid, malic acid, and dicarboxylic acid, citric acid, azelic acid, lactic acid, and combinations thereof.

26. The flooring application of claim 15, wherein the initiator is a cationic type initiator.

27. The flooring application of claim 26, wherein the initiator further includes a photosensitizer.

* * * * *